US012103192B2

(12) United States Patent
Huang

(10) Patent No.: US 12,103,192 B2
(45) Date of Patent: Oct. 1, 2024

(54) ASSEMBLED VISUAL MACHETE

(71) Applicant: Changsha Mobile Electronic Technology Co., Ltd., Changsha (CN)

(72) Inventor: Hui Huang, Changsha (CN)

(73) Assignee: Changsha Mobile Electronic Technology Co., Ltd., Changsha (CN)

( * ) Notice: Subject to any disclaimer, the term of this patent is extended or adjusted under 35 U.S.C. 154(b) by 79 days.

(21) Appl. No.: 17/897,224

(22) Filed: Aug. 29, 2022

(65) Prior Publication Data

US 2022/0410416 A1 Dec. 29, 2022

(51) Int. Cl.

*B26B 3/00* (2006.01)
*A63H 33/00* (2006.01)
*F21S 4/26* (2016.01)
*F21V 17/00* (2006.01)
*F21V 19/00* (2006.01)
*F21V 33/00* (2006.01)

(52) U.S. Cl.

CPC *B26B 3/00* (2013.01); *F21S 4/26* (2016.01); *A63H 33/009* (2013.01); *F21V 17/007* (2013.01); *F21V 19/0045* (2013.01); *F21V 33/008* (2013.01)

(58) Field of Classification Search

CPC .... F21V 17/007; F21V 17/104; F21V 33/008; F21V 33/0084; F21V 19/0025; F21V 19/0035; F21V 19/0045; F21V 19/0065; F21V 19/007; F21V 21/002; F21V 21/112; F21V 21/116; F21V 21/35; F21V 21/40; F21V 21/406; F21V 23/06; B26B 11/008; A63H 33/009; A63B 43/06

See application file for complete search history.

(56) References Cited

U.S. PATENT DOCUMENTS 5,279,513 A * 1/1994 Connelly ............ A63H 33/009 446/485
5,321,591 A * 6/1994 Cimock ............... H03K 3/2828 362/186
5,697,695 A * 12/1997 Lin .......................... F21L 4/02 362/184
5,947,789 A * 9/1999 Chan ................... A63H 33/009 446/485
6,244,723 B1 * 6/2001 Talamo .................. G09F 13/00 362/186

(Continued)

*Primary Examiner* — Peggy A Neils
*Assistant Examiner* — James M Endo
(74) *Attorney, Agent, or Firm* — Hemisphere Law, PLLC; Zhigang Ma

(57) ABSTRACT

The present disclosure discloses an assembled visual machete, including a first machete body and a second machete body; the first machete body and the second machete body are integrally assembled through a detachable bridging part; light emitting diode (LED) light strips are arranged on the first machete body and the second machete body; a control board and a battery are arranged in the bridging part; and the battery and the LED light strips are electrically connected to the control board. Therefore, when it is necessary to package and transport the entire assembled visual machete, the first machete body and the second machete body at both ends of the bridging part can be directly removed, and the bridging part, the first machete body and the second machete body in a detached state are placed in a package.

9 Claims, 5 Drawing Sheets

(56) References Cited

U.S. PATENT DOCUMENTS

| | | | | |
|---|---|---|---|---|
| 6,419,371 | B1 * | 7/2002 | McCalla | B25B 23/18 362/120 |
| 7,452,097 | B1 * | 11/2008 | Dunbar | B26B 13/22 362/109 |
| 10,113,576 | B1 * | 10/2018 | Weeks | F16B 21/02 |
| 2001/0024973 | A1 * | 9/2001 | Meredith | A63H 33/009 463/36 |
| 2007/0019398 | A1 * | 1/2007 | Chen | E01F 9/617 362/102 |
| 2010/0048097 | A1 * | 2/2010 | Ma | F21S 4/22 446/485 |
| 2010/0157582 | A1 * | 6/2010 | Bertken | F21L 4/02 362/158 |
| 2012/0261148 | A1 | 10/2012 | Sukhovitsky | |
| 2013/0223045 | A1 * | 8/2013 | Cammenga | B26B 11/008 362/119 |
| 2015/0126260 | A1 * | 5/2015 | Lynch | A63F 13/245 463/8 |
| 2015/0328761 | A1 | 11/2015 | Busch | |
| 2016/0270301 | A1 | 9/2016 | West et al. | |
| 2019/0293384 | A1 * | 9/2019 | Abbatescianni | F41B 13/02 |

* cited by examiner

ASSEMBLED VISUAL MACHETE

TECHNICAL FIELD

The present disclosure relates to the technical field of props, in particular to an assembled visual machete.

BACKGROUND

As we all know, a visual machete is a kind of prop for shows, performances and juggling. A user rotates and plays with the visual machete while holding the middle of a visual machete. At night, a flowing artistic light effect is achieved.

However, the existing visual machete cannot be disassembled because it is long, so the visual machete has a large package volume and is inconvenient for transportation; a large packaging box also wastes resources and increases the manufacturing cost; and it is inconvenient for users to store and carry a long visual machete. Therefore, the visual machete is inconvenient for actual use by users. To this end, an assembled visual machete is provided to solve the above-mentioned problems.

SUMMARY

For the shortcomings in the prior art, the present disclosure aims to provide an assembled visual machete.

In order to achieve the above objective, the present disclosure adopts the following technical solution:

An assembled visual machete includes a first machete body and a second machete body, wherein the first machete body and the second machete body are integrally assembled through a detachable bridging part; light emitting diode (LED) light strips are arranged on the first machete body and the second machete body; a control board and a battery are arranged in the bridging part; and the battery and the LED light strips are electrically connected to the control board.

Preferably, two ends of the bridging part are respectively connected to the first machete body and the second machete body through a quick release device; the quick release device includes connection blocks arranged at one end of the first machete body and one end of the second machete body, and connection slots arranged at two ends of the bridging part; and the connection blocks are matched with the connection slots.

Preferably, slidable lock catches are mounted at positions, located at notches of the connection slots, of two ends of the bridging part; springs are mounted between an inner wall of the bridging part and lower ends of the lock catches; and under the elastic action of the springs, the lock catches move and block the notches of the connection slots in a normally closed manner.

Preferably, the bridging part includes a first handle and a second handle; the first handle and the second handle are respectively connected to the first machete body and the second machete body through the quick release device; the first handle is internal provided with at least one first magnet, and the second handle is internally provided with at least one second magnet matched with the first magnet; and the first handle and the second handle are magnetically connected through magnetic attraction forces of the first magnet and the second magnet during fitting.

Preferably, the connection slots are respectively located at one end of the first handle and one end of the second handle; the connection block of the first machete body is plugged into the connection slot of the first handle and integrally assembled; the connection block of the second machete body is plugged into the connection slot of the second handle and integrally assembled; the lock caches are slidably mounted at the notches of the connection slots of the first handle and the second handle; and the control board and the battery are both located in the first handle and the second handle.

Preferably, plugs are arranged in the connection slots; one end of each connection block is provided with a socket matched with each plug; and when the connection blocks are plugged into the connection slots, the control board is electrically connected to the LED light strips in a manner of plugging the plugs into the sockets.

Preferably, the first machete body and the second machete body are crescent-shaped or banana-shaped.

Preferably, the LED light strips are arranged on outer surfaces of the first machete body and the second machete body.

Preferably, the LED light strips are arranged in inner cavities of the first machete body and the second machete body, and the first machete body and the second machete body are made of a transparent or semi-transparent material.

Preferably, the control board is provided with a button, a switch and a USB input port which are exposed from an outer surface of the bridging part.

Due to the adoption of the above-mentioned solution, the first machete body and the second machete body of the present disclosure are integrally assembled through the detachable bridging part, and the first machete body and the second machete body are mounted at the two ends of the bridging part through the quick release device. Therefore, when it is necessary to package and transport the entire assembled visual machete, the first machete body and the second machete body at both ends of the bridging part can be directly removed, and the bridging part, the first machete body and the second machete body in a detached state are placed in a package. The assembled visual machete is disassembled for being packaged in sections, so that the overall storage length is greatly reduced; it is convenient for users to package and transport the assembled visual machete; the package volume is effectively reduced; the manufacturing cost is reduced; and the resources are saved. Meanwhile, the first handle and the second handle are fitted to each other and can be firmly magnetically connected together; it is convenient for users to disassemble and carry the entire assembled visual machete. During use, the assembled visual machete can be directly magnetically assembled, so that a user can store and carry the assembled visual machete effectively and conveniently; and actual use needs of the user are met. During use, the assembled visual machete is also very easy to assemble, which is simple in structure and convenient to operate and has extremely high practicability.

IN THE DRAWINGS

Figure 1:
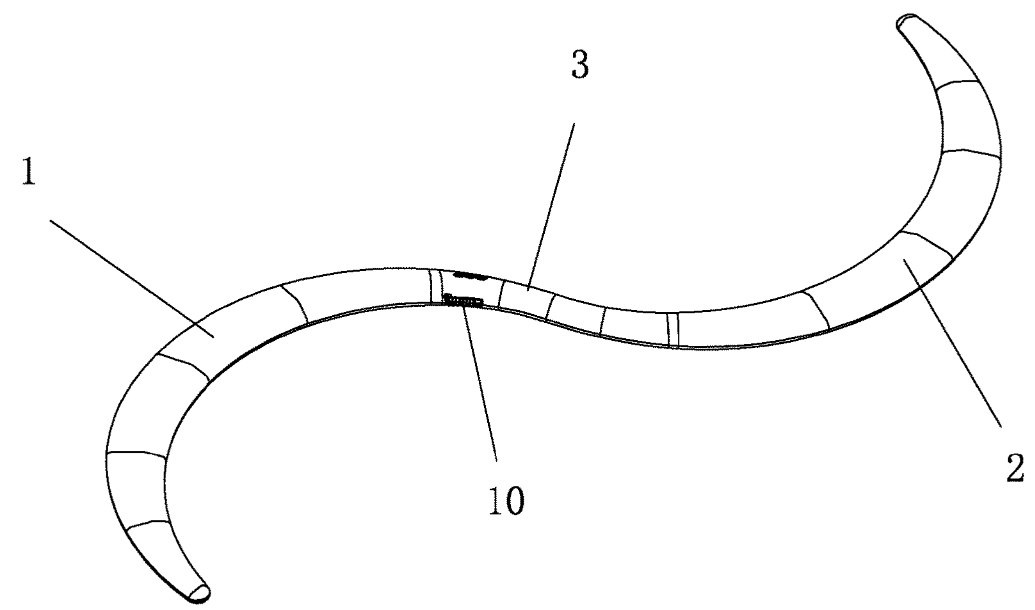
FIG. 1 is an axonometric diagram according to an embodiment of the present disclosure.

1: first machete body; 2: second machete; 3: bridging part; 4: LED light strip; 5: control board; 6: battery; 7: quick release device; 8: connection block; 9: connection slot; 10: lock catch; 11: spring; 12: first handle; 13: second handle; 14: first magnet; 15: second magnet; 16: socket; 17: plug; 18: button; 19: switch; and 20: USB input port.

DETAILED DESCRIPTION OF THE EMBODIMENTS

The embodiments of the present disclosure are described in detail below in combination with the accompanying drawings. However, the present disclosure can be implemented in various different ways defined and covered by the claims.

Before illustration of the work of this embodiment, in order to facilitate examiner's understanding of this embodiment, an LED light strip 4 is particularly explained: The LED light strip 4 is formed by assembling LED beads on a strip-type flexible printed circuit (FPC) or a hard printed circuit board (PCB), and is named since it is like a strip. The LED light strip is gradually widely applied in various decoration and product industries due to its long service life (the normal life is generally 8-100000 hours), high energy conservation and environmental friendliness.

As shown in FIG. 1 to FIG. 6, an assembled visual machete provided by this embodiment includes a first machete body 1 and a second machete body 2; the first machete body 1 and the second machete body 2 are integrally assembled through a detachable bridging part 3; LED light strips 4 are arranged on the first machete body 1 and the second machete body 2; a control board 5 and a battery 6 are arranged in the bridging part 3; and the battery 6 and the LED light strips 4 are electrically connected to the control board 5. During actual use of this embodiment, the first machete body 1 and the second machete body 2 are integrally assembled through the bridging part 3. When it is necessary to package and transport the assembled visual machete, a user removes the first machete body 1 and the second machete body 2 at both ends of the bridging part 3, and puts them into a package. The assembled visual machete is disassembled for being packaged in sections, so that the overall storage length is greatly reduced; it is convenient for users to package and transport the assembled visual machete; the package volume is effectively reduced; the manufacturing cost is reduced; and the resources are saved.

Further, two ends of the bridging part 3 of this embodiment are respectively connected with the first machete body 1 and the second machete body 2 through a quick release device 7; the quick release device 7 includes connection blocks 8 arranged at one end of the first machete body 1 and one end of the second machete body 2, and connection slots 9 arranged at two ends of the bridging part 3; and the connection blocks 8 are matched with the connection slots 9. Therefore, the first machete body 1 and the second machete body 2 are plugged and mounted in the connection slots 9 at the two ends of the bridging part 3 through the connection blocks 8 at one end of the first machete body 1 and one end of the second machete body 2, and are integrally assembled for use (as shown in FIG. 1), so that it is convenient for a user to assemble, disassemble and use the assembled visible machete. In an actual design, the connection slots 9 may be T-shaped slots or dovetail slots. The connection blocks 8 may be designed to be T-shaped blocks or trapezoid blocks.

Figure 6:
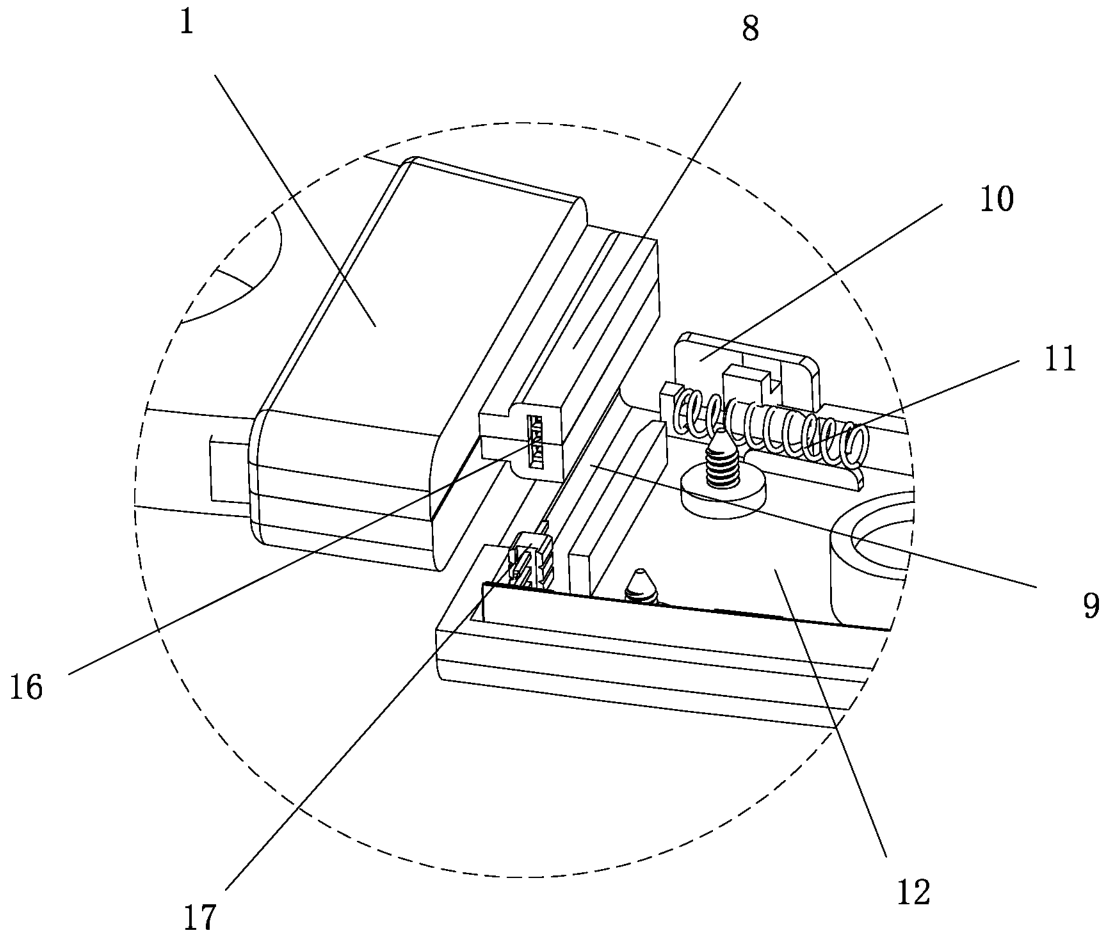
FIG. 6 is a schematic structural diagram of a socket and a plug according to an embodiment of the present disclosure.

Further, slidable lock catches 10 are mounted at positions, located at notches of the connection slots 9, of two ends of the bridging part 3; and springs 11 are mounted between an inner wall of the bridging part 3 and lower ends of the lock catches (as shown in FIG. 6). Under the elastic action of the springs 11, the lock catches 10 move and block the notches of the connection slots 9 in a normally closed manner. Therefore, when the first machete body 1 and the second machete body 2 are required to be mounted at the two ends of the bridging part 3, the lock catches 10 are first pushed to expose the notches of the connection slots 9; the connection blocks 8 are plugged and mounted in the connection slots 9; at the same time, under the elastic action of the springs 11, the lock catches 10 move quickly to block the notches of the connection slots 9 in the normally closed manner, so that the normally closed lock catches 10 can effectively prevent a connection failure between the first machete body 1, as well as the second machete body 2, and the bridging part 3 because the connection blocks 8 are separated from the connection slots 9 during actual use by a user, and the first machete body 1 and the second machete body 2 are stably connected with the bridging part 3; furthermore, when the user needs to disassemble the entire assembled visible machete, the lock catches are first pulled again, and the notches of the connection slots 9 are not blocked; and under the action of an external force, the connection blocks 8 are separated from the connection slots 9, and the first machete body 1 and the second machete body 2 are then separated and removed from the bridging part 3, so that the assembling and disassembling can be completed only by two steps, and the operation is very simple.

Figure 2:
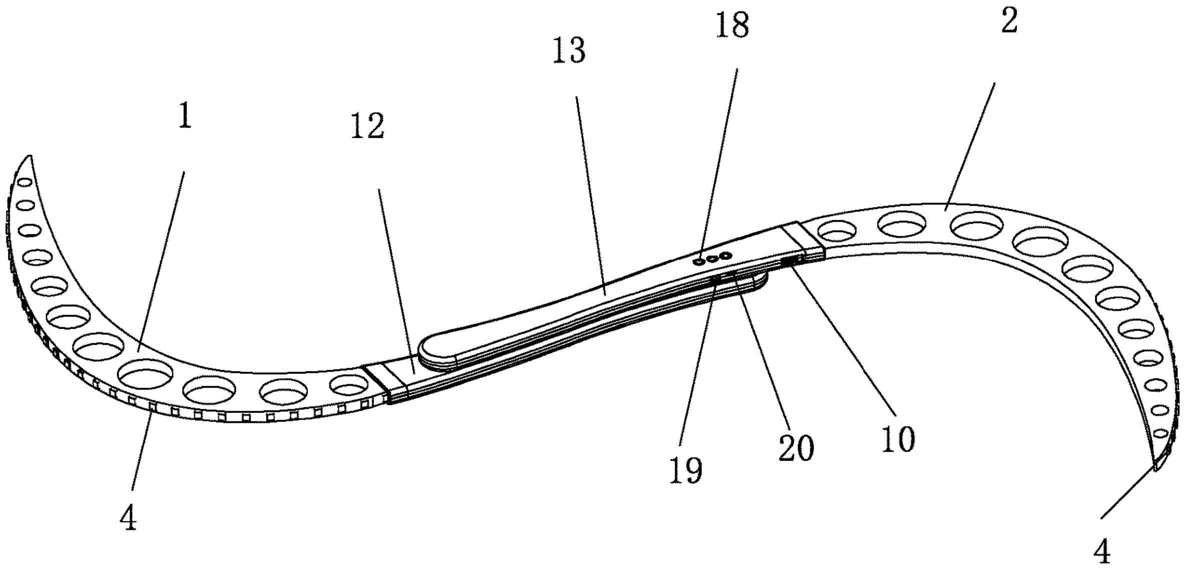
FIG. 2 is a schematic structural diagram of magnetic attraction between a first handle and a second handle on the back according to an embodiment of the present disclosure.
Figure 5:
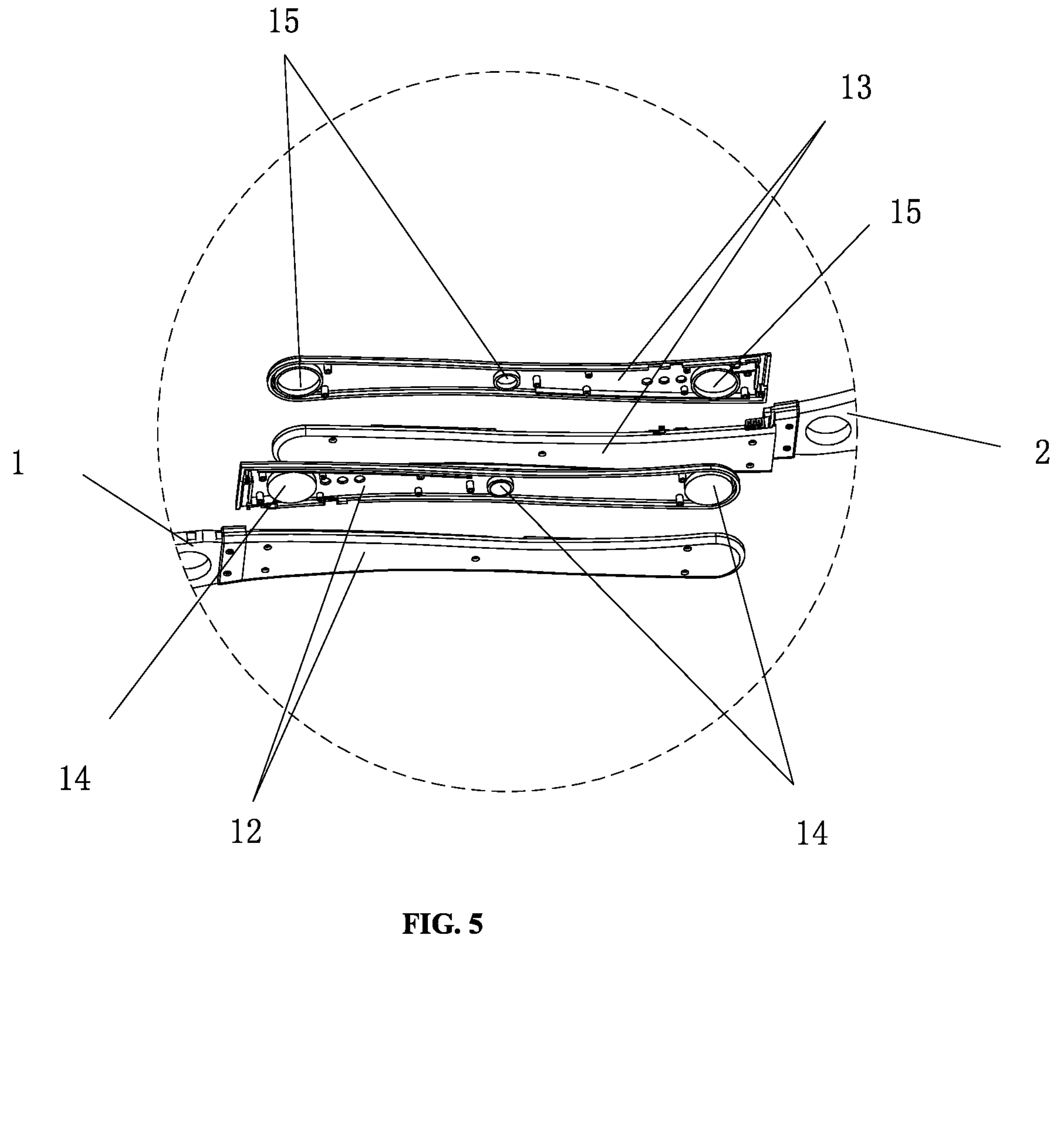
FIG. 5 is a schematic diagram of installation of a first magnet and a second magnet according to an embodiment of the present disclosure.

Further, the bridging part 3 of this embodiment includes a first handle 12 and a second handle 13; the first handle 12 and the second handle 13 are respectively connected to the first machete body 1 and the second machete body 2 through the quick release device 7; the first handle 12 is internal provided with at least one first magnet 14, and the second handle 13 is internally provided with at least one second magnet 15 matched with the first magnet 14; and the first handle 12 and the second handle 13 are magnetically connected through magnetic attraction forces of the first magnet 14 and the second magnet 15 during fitting (as shown in FIG. 2 and FIG. 5). Therefore, when carrying the assembled visible machete, the user can quickly remove the first handle 12 and the second handle 13 and store and move them, so that actual operations of the user areas facilitated. During use, the first handle 12 and the second handle 13 can directly magnetically attract each other when they are fitted to each other, and are then directly integrally assembled. Therefore, a user can store and carry the assembled visual machete effectively and conveniently; and actual use needs of the user are met. The assembled visual machete is also very easy to assemble for use. Furthermore, the LED light strips 4 are arranged in both of the first handle 12 and the second handle 13 and are electrically connected with the control board 5, so that after being assembled, the entire visual machete can emit light and is more beautiful; and the assembled visual machete has higher ornamental value when the user spins the assembled visual machete and plays juggling.

Further, the connection slots 9 of this embodiment are respectively located at one end of the first handle 12 and one end of the second handle 13; the connection block 8 of the first machete body 1 is plugged into the connection slot 9 of the first handle 12 and integrally assembled; the connection block 8 of the second machete body 2 is plugged into the connection slot 9 of the second handle 13 and integrally assembled; the lock catches 10 are slidably mounted at the notches of the connection slots 9 of the first handle 12 and the second handle 13; and the control board 5 and the battery 6 are both located in the first handle 12 and the second handle 13. Therefore, the first handle 12 and the second handle 13 can be respectively assembled to and disassembled from the first machete body 1 and the second machete body 2 by means of plugging fit between the connection blocks 8 and the connection slots 9, so that the first handle 12 and the second handle 13 can be independently removed from the first machete body 1 and the second machete body 2 to further reduce the overall storage volume and facilitate packaging, transportation and carrying.

Further, plugs 17 are arranged in the connection slots 9 of this embodiment; one end of each connection block 8 is provided with a socket 16 matched with each plug 17; and when the connection blocks 8 are plugged into the connection slots 9, the control board 5 is electrically connected to the LED light strips 4 by means of plugging the plugs 17 into the sockets 16. Therefore, by use of the plugs 17 and the sockets 16 and due to the detachable movable electrical connection, when the first machete body 1 and the second machete body 2 are integrally assembled with the bridging part 3 in a manner of plugging the connection blocks 8 into the connection slots 9, the control board 5 is electrically connected to the LED light strips 4 by means of the fitness between the plugs 17 and the sockets 16, so that quick assembling of the first machete body 1 and the second machete body 2 to the bridging part 3 is achieved, and quick and synchronous electrical connection between the control board 5 and the LED light strips 4 is also achieved.

Further, the first machete body 1 and the second machete body 2 of this embodiment are crescent-shaped or banana-shaped. Therefore, it is more beautiful when the first machete body 1 and the second machete body 2 are rotated.

Further, the LED light strips 4 of this embodiment are arranged on outer surfaces of the first machete body 1 and the second machete body 2 (as shown in FIG. 2). The LED light strips 4 can be easily mounted on the outer surfaces of the first machete body 1 and the second machete body 2, so that the structural complexity of the first machete body 1 and the second machete body 2 is reduced, and the manufacturing cost of the assembled visual machete is reduced.

Figure 3:
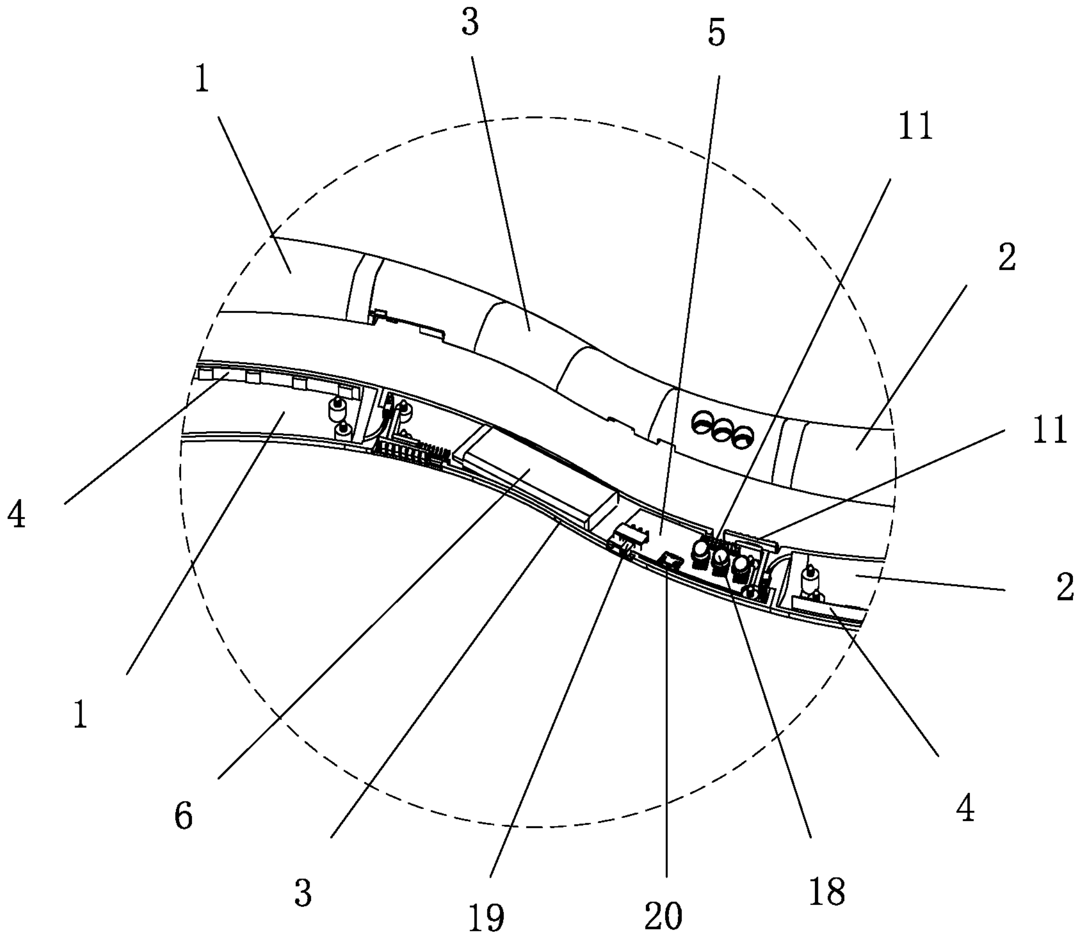
FIG. 3 is a schematic structural diagram of an interior according to an embodiment of the present disclosure.
Figure 4:
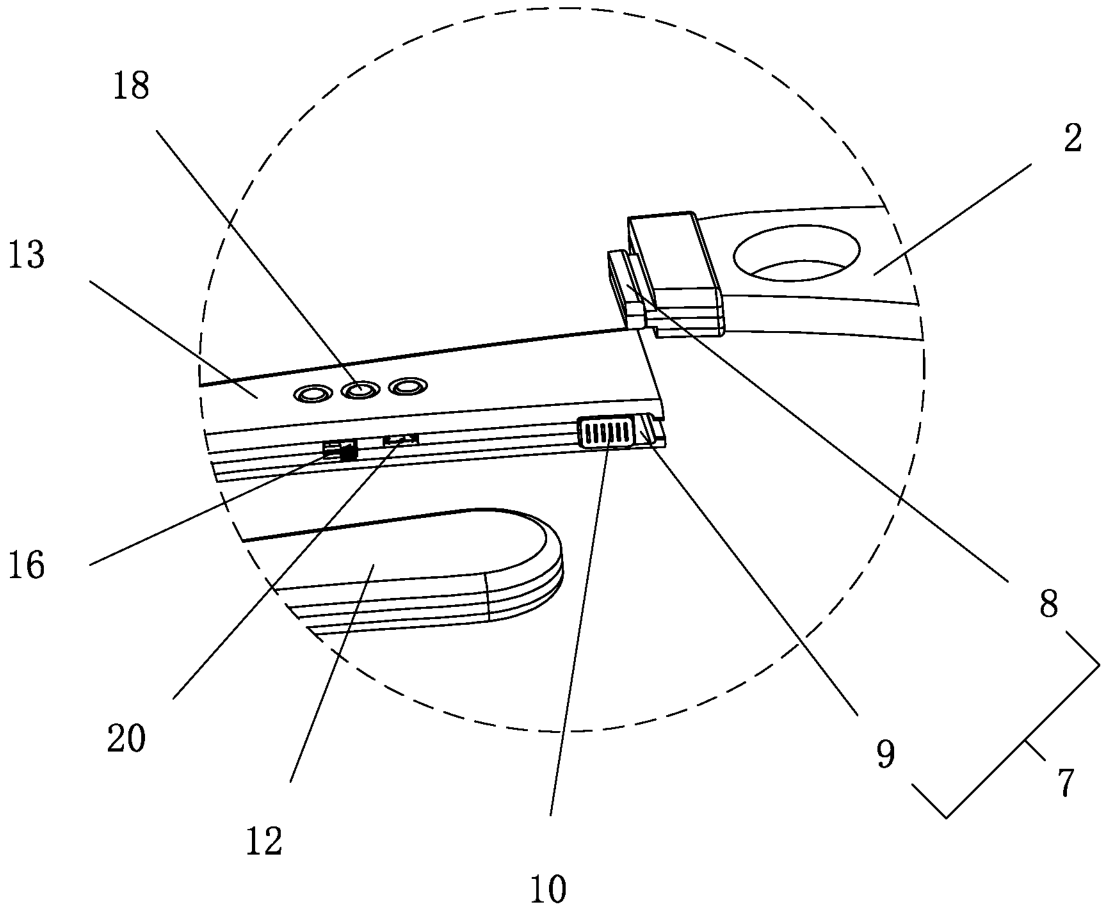
FIG. 4 is a schematic structural diagram of quick release device according to an embodiment of the present disclosure.

Further, the LED light strips 4 of this embodiment are arranged in inner cavities of the first machete body 1 and the second machete body 2 (as shown in FIG. 3), and the first machete body 1 and the second machete body 2 are made of a transparent or semi-transparent material. Therefore, the LED light strips 4 are effectively protected in the inner cavities of the first machete body 1 and the second machete body 2, so that the LED light strips 4 can be prevented from water and dust, and the grade of the assembled visual machete is also effectively increased.

Further, the control board 5 of this embodiment is provided with a button 18, a switch 19 and a USB input port 20 which are exposed from an outer surface of the bridging part 3. The button 18 can be used for adjusting brightness and modes of the light strips; the switch 19 is used for cutting off internal power during transportation, so that the transportation is safer and saves power; and the USB input port 20 is used for transmitting data and charging the battery 6. The USB input port 20 is a USB-Type-C interface seat, a USB-Type-B interface seat, a DC interface seat, a Lightning interface seat, and a Micro USB interface seat, or, a USB-Type-C plug, a USB-Type-B plug, a DC plug, a Lightning plug, and a Micro USB plug. A specific interface standard of the USB input port 20 is not specifically limited in this embodiment.

The above descriptions are only the preferred embodiments of the present disclosure, and are not intended to limit the patent scope of the present disclosure. Any equivalent structure or equivalent process transformation made by using the content of the specification and drawings of the present disclosure and directly or indirectly applied to other related technical fields shall all be similarly included in the scope of patent protection of the present disclosure.

What is claimed is:

1. An assembled visual machete, comprising a first machete body and a second machete body, wherein the first machete body and the second machete body are integrally assembled through a detachable bridging part;

light emitting diode (LED) light strips are arranged on the first machete body and the second machete body; a control board and a battery are arranged in the bridging part;

and the battery and the LED light strips are electrically connected to the control board;

wherein two ends of the bridging part are respectively connected to the first machete body and the second machete body through a quick release device; the quick release device comprises connection blocks arranged at one end of the first machete body and one end of the second machete body, and connection slots arranged at two ends of the bridging part; and the connection blocks are matched with the connection slots.

2. The assembled visual machete according to claim 1, wherein slidable lock catches are mounted at positions, located at notches of the connection slots, of two ends of the bridging part; springs are mounted between an inner wall of the bridging part and lower ends of the lock catches; and under the elastic action of the springs, the lock catches move and block the notches of the connection slots in a normally closed manner.

3. The assembled visual machete according to claim 2, wherein the bridging part comprises a first handle and a second handle; the first handle and the second handle are respectively connected to the first machete body and the second machete body through the quick release device; the first handle is internal provided with at least one first magnet, and the second handle is internally provided with at least one second magnet matched with the first magnet; and the first handle and the second handle are magnetically connected through magnetic attraction forces of the first magnet and the second magnet during fitting.

4. The assembled visual machete according to claim 3, wherein the connection slots are respectively located at one end of the first handle and one end of the second handle; the connection block of the first machete body is plugged into the connection slot of the first handle and integrally assembled; the connection block of the second machete body is plugged into the connection slot of the second handle and integrally assembled; the lock caches are slidably mounted at the notches of the connection slots of the first handle and the second handle; and the control board and the battery are both located in the first handle and the second handle.

5. The assembled visual machete according to claim 1, wherein plugs are arranged in the connection slots; one end of each connection block is provided with a socket matched with each plug; and when the connection blocks are plugged into the connection slots, the control board is electrically connected to the LED light strips in a manner of plugging the plugs into the sockets.

6. The assembled visual machete according to claim 1, wherein the first machete body and the second machete body are crescent-shaped or banana-shaped.

7. The assembled visual machete according to claim 1, wherein the LED light strips are arranged on outer surfaces of the first machete body and the second machete body.

8. The assembled visual machete according to claim 1, wherein the LED light strips are arranged in inner cavities of the first machete body and the second machete body, and the first machete body and the second machete body are made of a transparent or semi-transparent material.

9. The assembled visual machete according to claim 1, wherein the control board is provided with a button, a switch and a USB input port which are exposed from an outer surface of the bridging part.

* * * * *